United States Patent [19]
Ross et al.

[11] Patent Number: 5,915,117
[45] Date of Patent: Jun. 22, 1999

[54] COMPUTER ARCHITECTURE FOR THE DEFERRAL OF EXCEPTIONS ON SPECULATIVE INSTRUCTIONS

[75] Inventors: Jonathan K. Ross, Sunnyvale; Jack D. Mills; James O. Hays, both of San Jose; Stephen G. Burger, Santa Clara; Dale C. Morris, Menlo Park; Carol L. Thompson, San Jose; Rajiv Gupta, Los Altos, all of Calif.; Stefan M. Freudenberger, Brookline, Mass.; Gary N. Hammond, Campbell; Ralph M. Kling, Sunnyvale, both of Calif.

[73] Assignee: Institute For The Development of Emerging Architectures, L.L.C., Cupertino, Calif.

[21] Appl. No.: 08/949,295

[22] Filed: Oct. 13, 1997

[51] Int. Cl.$^6$ ............................................. G06F 9/38
[52] U.S. Cl. ............................................ 395/735; 395/591
[58] Field of Search ..................................... 395/735, 591

[56] References Cited

U.S. PATENT DOCUMENTS

| | | | |
|---|---|---|---|
| 5,438,677 | 8/1995 | Adams et al. | 395/736 |
| 5,634,023 | 5/1997 | Adler et al. | 395/591 |
| 5,778,219 | 7/1998 | Amerson et al. | 395/591 |
| 5,794,029 | 8/1998 | Babaian et al. | 395/588 |

*Primary Examiner*—William M. Treat

[57] ABSTRACT

The inventive system and method allows for software control of hardware deferral of exceptions in speculative operations, and comprises three components. The first component is processor stored information which reflects the code generation strategy of applications and is used by hardware and the operating system to control exception deferral. The second component is processor stored information set by the operating system to specify to hardware which type of faults should be automatically deferred. The third component is further processor stored information which indicates to the hardware to defer certain exception causing aspects of the speculative operation, while performing other non excepting aspects of the speculative operation. The stored information is set after the operating system exception handler has unsuccessfully attempted fault resolution.

34 Claims, 3 Drawing Sheets

COMPUTER ARCHITECTURE FOR THE DEFERRAL OF EXCEPTIONS ON SPECULATIVE INSTRUCTIONS

REFERENCE TO RELATED APPLICATIONS

The present application is being concurrently filed with commonly assigned U.S. patent application, Ser. No. 08/953,836 entitled "RECOVERY FROM EXCEPTION DEFERRED BY SPECULATIVE INSTRUCTIONS", the disclosure of which is incorporated herein by reference.

TECHNICAL FIELD OF THE INVENTION

This application relates in general to instruction set architecture and computer program optimizations, and in specific to software control of the mechanism to defer exceptions on speculative instructions.

BACKGROUND OF THE INVENTION

A "basic block" is a contiguous set of instructions bounded by branches and/or branch targets, containing no branches or branch targets. This implies that if any instruction in a basic block is executed, then all instructions in the basic block will be executed, i.e. the instructions contained within any basic block are executed on an all-or-nothing basis. The instructions within a basic block are enabled for execution when control is passed to the basic block by an earlier branch targeting the basic block ("targeting" as used here includes both explicit targeting via a taken branch as well as implicit targeting via a not taken branch). The foregoing implies that if control is passed to a basic block, then all instructions in the basic block must be executed; if control is not passed to the basic block, then all instructions in the basic block must not be executed. The act of executing, or specifying the execution of, an instruction before control has been passed to the instruction is called "speculation." Speculation performed by the processor at program runtime is called "dynamic speculation" while speculation specified by the compiler is called "static speculation." Dynamic speculation is known in the prior art.

Two instructions are deemed "independent" when one does not require the result of the other; when one instruction does require the result of the other they are termed "dependent" instructions. Independent instructions may be executed in parallel while dependent instructions must be executed in serial fashion. Program performance is improved by identifying independent instructions and executing as many of them in parallel as possible. Experience indicates that more independent instructions can be found by searching across multiple basic blocks than can be found by searching only within individual basic blocks, however, simultaneously executing instructions from multiple basic blocks requires speculation. Identifying and scheduling independent instructions, and thereby increasing performance, is one of the primary tasks of compilers and processors. The trend in compiler and processor design has been to increase the scope of the search for independent instructions in each successive generation. In prior art instruction sets, an instruction that may generate an exception cannot be speculated by the compiler since, if the instruction causes an exception, the program may erroneously generate an exception when the program should not have. This restricts the useful scope of the compiler's search for independent instructions and makes it necessary for speculation to be performed at program runtime by the processor via dynamic speculation. However, dynamic speculation entails a significant amount of hardware complexity, furthermore, the complexity increases exponentially with the number of basic blocks over which dynamic speculation is applied—this places a practical limit on the scope of dynamic speculation. By contrast, the scope over which the compiler can search for independent instructions is much larger—potentially the entire program. Furthermore, once the compiler has been designed to perform static speculation across a single basic block boundary, very little additional complexity is incurred by statically speculating across several basic block boundaries.

If static speculation is to be undertaken, then several problems must be solved, one of the most important of which is the handling of exceptional conditions encountered by statically speculated instructions. Hereafter, unless explicitly stated otherwise, references to speculation, speculative instructions, etc. shall be taken to refer to static rather than dynamic speculation.

Since, as noted above, exceptions on speculative instructions cannot be delivered at the time of execution of the instructions, a compiler-visible mechanism is needed to defer the delivery of the exceptions until control is passed to the basic block from which the instructions were speculated (known as the "originating basic block"). Mechanisms that perform a similar function exist in the prior art for deferring and later delivering exceptions on dynamically speculated instructions, however, by definition the mechanisms are not visible to the compiler and therefore cannot be manipulated by the compiler into playing a role in compiler-directed speculation. No known method or apparatus for deferring and later delivering exceptions on statically speculated instructions has been enabled in the prior art. Limited forms of static speculation do exist in the prior art, however: (1) the forms do not involve deferral and later recovery of exceptional conditions, and (2) the forms do not enable static speculation over the breadth and scope of the present invention.

An example of prior art limited static speculation is special case handling of loads from the memory page starting at address zero—called "page zero." In most systems access to page zero is illegal and typically causes a protection violation exception. In certain prior art systems, the compiler and the operating system (OS) mutually agree that any exceptions on loads from page zero are to be suppressed (not deferred) and that, in the event of the suppression, the destination of the load is to be written with zero. This allows the compiler to speculate loads that possess the characteristic that, if they do access illegal memory, they do so only via page zero. The characteristic occurs because the number zero is sometimes used to mark the boundary of data structures and any load going beyond the boundary will therefore attempt to access address zero. It should be noted that the limited form of speculation just described does not involve or allow deferral and later delivery of exceptions and only applies to the narrow class of loads that possess the characteristic of only accessing page zero when illegal. In the event that the load is defined to perform auxiliary operations in addition to reading memory, e.g. adding a value to an address register, then the OS is responsible for emulating the auxiliary operations in software the emulation will reduce program performance.

Another example of prior art limited static speculation is the speculation of instructions that do not cause exceptions. For example, typically the compare instruction is defined such that it does not generate any exceptions. A properly designed compiler may then speculate the compare since the only side effect is the writing of a destination. In the event that control is not passed to the compare's originating basic block, the destination is simply discarded. Another example is a load instruction from an address that is known to be valid at compile time and known to remain constant during runtime, e.g. a global variable. These conditions guarantee that if any exceptions do occur, they will not be fatal and can be handled speculatively without side effects—although the handling of the speculative exceptions may reduce overall performance. Again it should be noted that the limited forms of speculation just described do not involve or allow deferral and only apply to a restricted class of instructions.

Therefore, when undertaking static speculation, there is a need in the art to enable a mechanism to defer exceptions on speculative instructions that applies to as many forms of speculation as possible. The mechanism must posses very low latency otherwise the performance of a program compiled with speculation may actually be lower than the same program compiled without speculation. The mechanism must also place minimal restrictions on the form and the construction of software in order to allow the execution of legacy software, to minimize the impact on software developers, and to maximize the range of software implementation choices. A desired characteristic of The mechanism is to allow the computer system to dynamically adapt to program behavior in order to maximize performance over the broadest possible range of software.

SUMMARY OF THE INVENTION

While the present invention applies to any type of speculative instruction, the following discussion will use the speculative load instruction by way of example. The data indicate that loads are one of the most important class of instructions to speculate. It is also the case that loads encounter the broadest range of exceptional conditions including translation cache misses, first access to a page, protection violations, and page not present. It is to be expected that, relative to non-speculative loads, speculative loads will tend to encounter more exceptional conditions. This is due to the fact that the memory address accessed by speculative loads has a greater probability of being nonsensical since, by definition, the speculative load is being executed earlier than the programmer intended.

A compiler-visible mechanism to handle exceptional conditions encountered by speculated instructions is the subject of IDEA application "RECOVERY FROM EXCEPTIONS DEFERRED BY SPECULATIVE INSTRUCTIONS, [HP Attorney docket no. 10971852-1), by Jack D. Mills, et al., which is concurrently filed. Instructions are divided into two classes: speculative and non-speculative. Initially all instructions are marked non-speculative. When the compiler schedules an instruction outside of the instruction's basic block, the compiler marks the instruction as speculative. Non-speculative instructions that encounter an exceptional condition generate an exception. Speculative instructions that encounter an exceptional condition do not generate an exception but rather write a "deferred exception token" (DET) into their destination, a note that the destination does not contain the correct result at this point. A non-speculative instruction that reads a deferred exception token generates an exception. A speculative instruction that reads a DET writes a DET into the instruction's destination (again the destination does not contain the correct result), this behavior is called "propagation." By placing a non-speculative instruction into the originating basic block of a given speculative instruction, and by configuring the non-speculative instruction to read a destination of the speculative instruction (or any location into which a DET may propagate), then a DET generated by the speculative instruction can be converted into an exception at the point at which control is passed to the originating basic block. After a DET is converted into an exception and the exceptional condition is corrected, then it is necessary to replace all previously generated DET's with correct results. This is achieved by a process called "recovery." Recovery requires the program to be augmented with additional code generated by the compiler. A compiler may choose not to include recovery code, e.g., to minimize program size, in which case the opportunity to defer exceptions is dramatically restricted.

It is conceivable to have every exceptional condition encountered by every speculative load generate an exception into the OS and to have the OS either correct the exceptional condition (if the correction has no program visible side effects) or manually write a DET into the load's destination thus deferring the exception. The drawback of this approach is that generating exceptions into the OS is a high latency operation typically causing processor pipeline flushes and cache misses. In addition, the OS would be required to emulate any auxiliary operations of the load in software, such as address post-increment, further exacerbating overall latency. If this high latency operation were to occur on every exceptional condition on every speculative load the performance of a program with speculation may fall well below the performance of the same program without speculation. What is desired is a mechanism to allow the rapid creation of deferred exception tokens without OS intervention.

To achieve this, the inventive method and apparatus uses a mechanism in the processor hardware to write a DET into an instruction's destination without generating an exception in a process called "eager deferral." In addition, the present invention introduces new processor state to control the operation of eager deferral in the form of multiple exception deferral bits contained in the Default Control Register (DCR). As noted earlier, loads may experience a broad range of exceptional conditions. In addition, the actions associated with certain exceptional conditions are not specified by the computer architecture but rather are determined by the implementation of the OS. Thus it is desired that said eager deferral mechanism allow deferral on an exception by exception basis thus allowing maximum OS implementation freedom. To achieve this benefit the preferred embodiment defines one bit in the DCR per load exception or class of related exceptions. It is to be noted that other mappings of bits to exceptions are possible without affecting the spirit and scope of the present invention, e.g. a single bit controlling multiple exception classes. In the preferred embodiment, each DCR bit determines whether one particular exception, or class of related exceptions, may be eagerly deferred or whether an exception is to be generated into the OS.

A single program is typically composed of multiple "compilation units" or "modules". In many cases all modules are not compiled at the same time or by the same compiler. Further, through a process known as "dynamic linking" it is possible that certain modules are identified only during runtime and are therefore not known at compile time. The sharing of modules is a common practice in software development, e.g. libraries, and it is possible for different modules to be compiled with different degrees of recovery code, e.g. recovery for all speculative loads vs. no recovery at all. The DCR bits of the present invention apply equally to all modules in a program. In the case of varying degrees of recovery code the DCR bits would need to be set for the lowest common denominator among all modules—and potentially the lowest performance. Modules are placed on memory page boundaries in the virtual address space. Virtual memory pages are mapped to physical memory pages via an OS controlled data structure called the "page table" containing a plurality of entries, each of which maps a single page. The page table maps pages containing both instructions and data, and typically instructions and data do not share the same page. Furthermore, to improve performance, the processor caches the page table in a structure called the Translation Lookaside Buffer (TLB). Modern processors typically cache page table entries mapping instructions separately from page table entries mapping data—the former in the ITLB and the latter in the DTLB. The present invention introduces additional processor state contained in page table entries mapping instructions (and therefore cached in the ITLB) called the ITLB.ed bit, i.e. each page table entry (and therefore each page) has its own ITLB.ed bit. The value of ITLB.ed for a particular page controls eager deferral for speculative loads contained on said page. The ITLB.ed bit specifies whether to never eagerly defer or to eagerly defer based on the value of the DCR bits. This affords the benefit of controlling eager deferral differently for different modules. For example, if module A includes recovery code while module B does not, then the ITLB.ed bits on the pages containing module A can be set to eagerly defer based on the value of the DCR bits while the ITLB.ed bits on the pages containing module B can be set to never eagerly defer. Thus, this inventive mechanism allows individual tailoring of eager deferral on a module-by-module basis and therefore places minimal restriction on the form and construction of software programs. The value of the DCR and ITLB.ed bits are determined by two pieces of information: (1) compiler knowledge of the state of recovery code which is transmitted to the OS via state in the load module which is interpreted by the OS program loader; and (2) OS self-knowledge of the usage of exceptions and the implementation of exception handlers. Note that alternative embodiments of DCR and ITLB.ed bits are possible without affecting the spirit and scope of the present invention, for example, multiple ITLB.ed bits could be defined that select from multiple copies of DCR bits.

To improve performance, the OS typically caches information relevant to instruction execution. This cached information is not visible to the hardware and therefore cannot factor into the decision on whether to eagerly defer since eager deferral is performed without reference to the OS—this may cause the DCR bits to be set conservatively. In addition, the OS can have greater visibility over program behavior than hardware and can use said visibility to tune program performance. For these reasons, in certain situations, it is desired to involve the OS in the exception deferral decision. In the present invention this is implemented by setting the DCR bits to cause an exception to be generated into the OS for those exceptions where the OS is caching information. The OS may then correct the exceptional condition based on said cached information or may still decide that deferral is the proper course of action. As noted earlier, this would require the OS to manually write a DET into the instruction's destination and to emulate any auxiliary operations of said instruction. To reduce the latency of this situation the present invention introduces additional processor state to allow the OS to inform the hardware that a DET should be written into the destination of a speculative load and that all other auxiliary operations should be performed. This bit is called the ISR.ed bit.

Accordingly, it is one technical advantage of the invention to allow the operating system to implement fault-specific optimizations, which is enabled by the DCR register.

It is another technical advantage of the invention that different recovery models can be supported among the various modules of a program.

It is a still further technical advantage of the invention that certain failed operations can be rapidly deferred without software interrupts, specifically without expensive pipeline breaks and software faults.

It is still further technical advantage of the invention to allow a more aggressive use of software static speculation, because the deferral of a failed speculation is less expensive.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
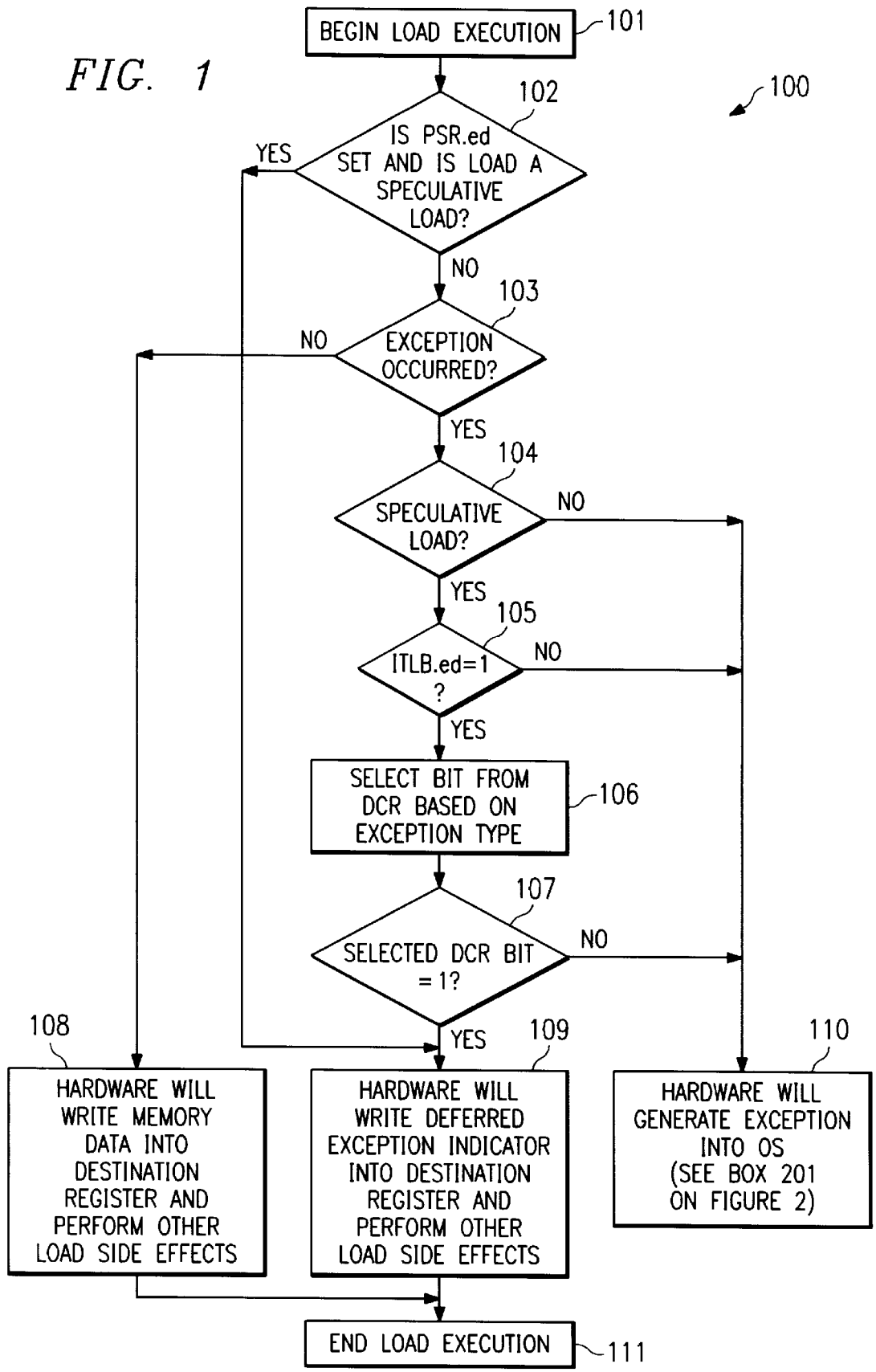
FIG. 1 depicts a flow diagram for hardware exception deferral.
Figure 2:
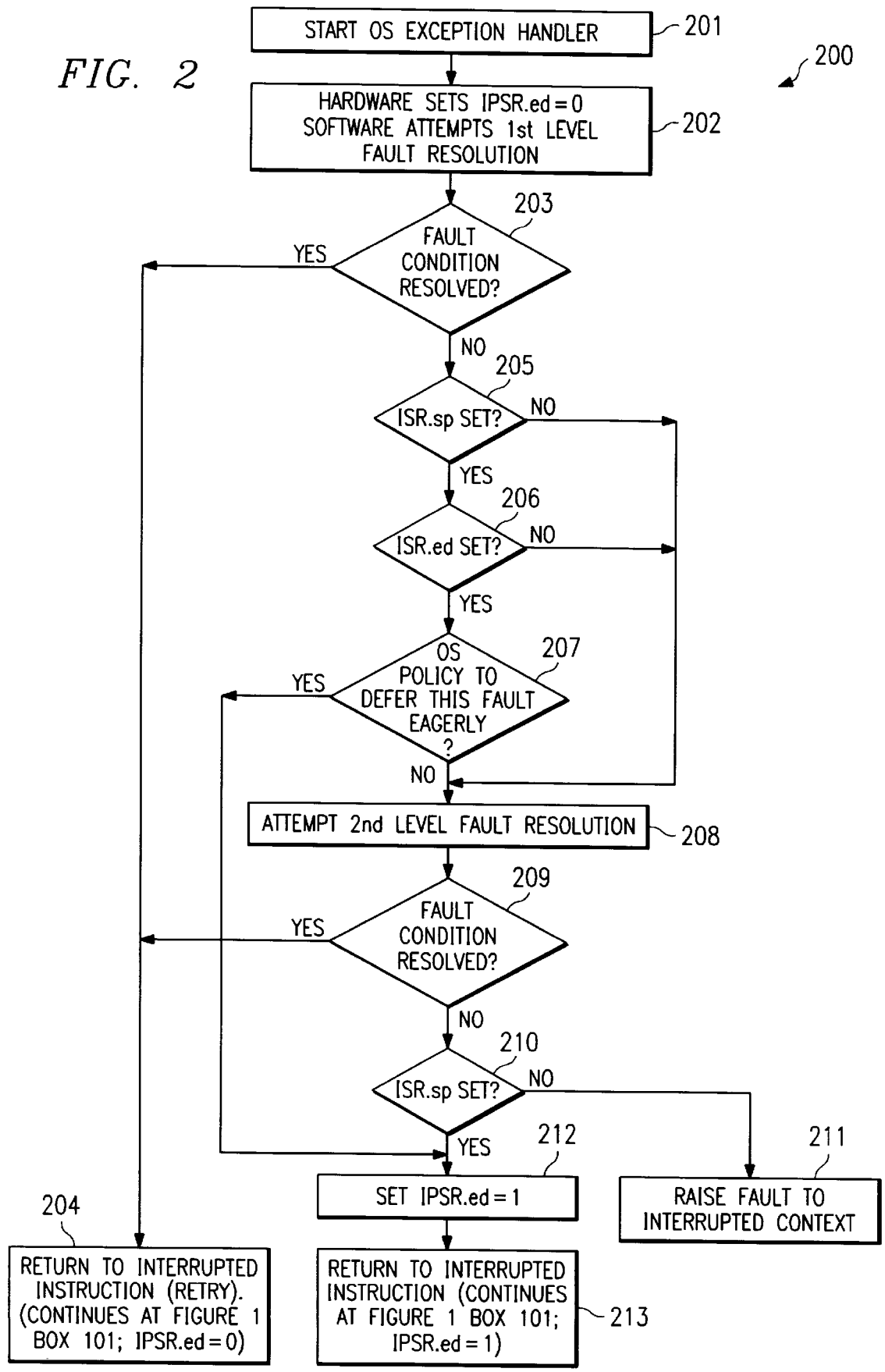
FIG. 2 depicts a flow diagram for software resolution of exceptions, including software directed deferral of speculative load exceptions.
Figure 3:
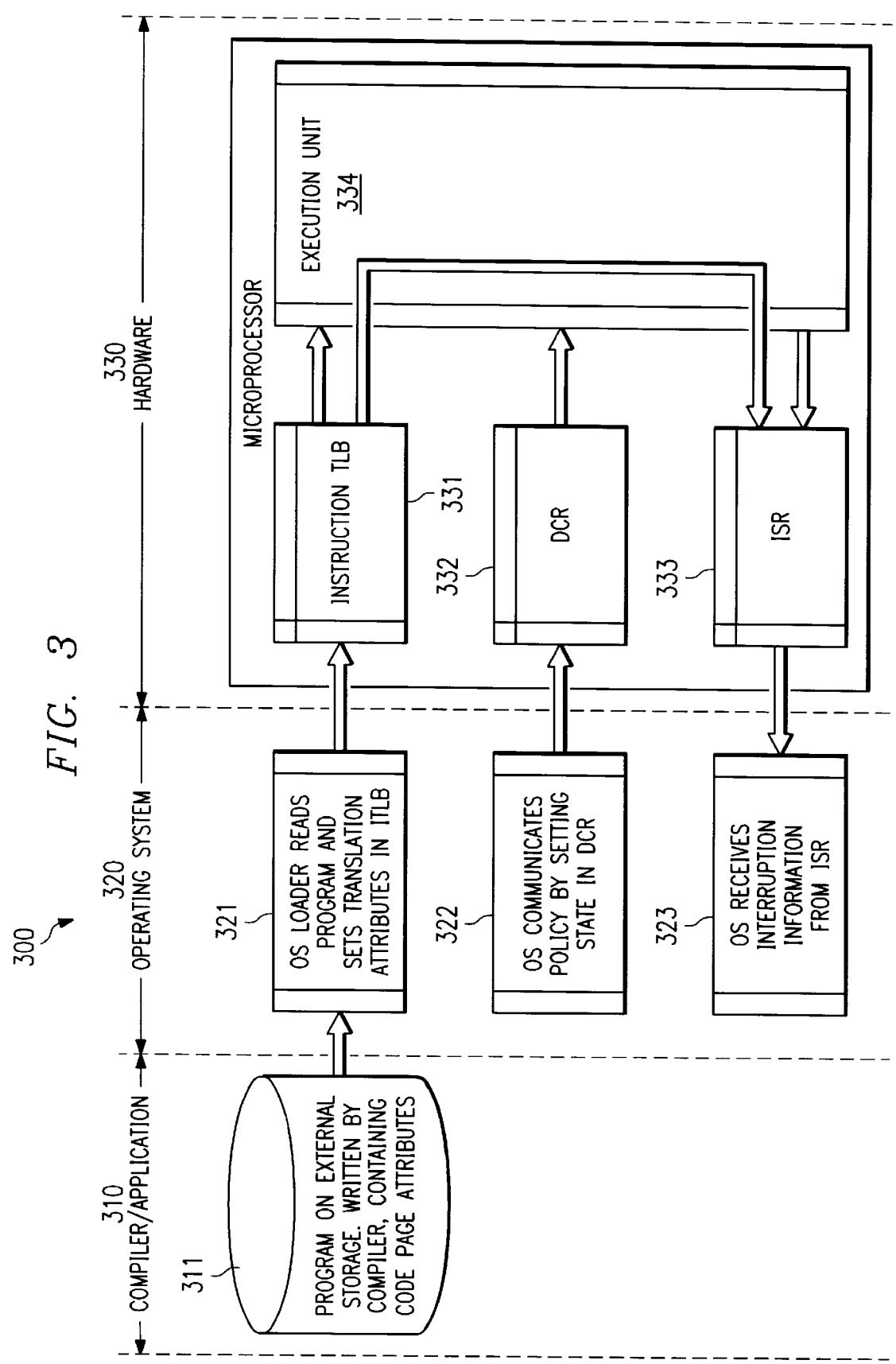
FIG. 3 depicts a schematic diagram with the system implementing the flow diagrams of FIGS. 1 and 2.

FIG. 3 depicts the inventive mechanism 300 that implements the flow diagrams of FIGS. 1 and 2. The system decides whether to have the hardware write a deferred exception token into the designated register of the load command or whether an exception should be generated. The inventive mechanism uses several bits of processor states or stored information to perform various functions. One of the bits is the instruction translation look-aside buffer 331 (TLB) entry called ITLB.ed (the .ed is for exception deferral). This bit controls whether any exceptions on any speculative loads contained in the present page can be deferred in hardware. By defining a bit 321 in the TLB entry to control hardware exception deferral, different software modules (which map to different pages in memory) can set this bit independently thus allowing each module to independently include recovery code. The inventive mechanism also uses multiple bits in a Control Register (DCR) 332. The preferred embodiment is to have one bit per exception type. Note that other mappings of bits to exception types are possible, e.g. a single bit controlling multiple exception types. However, in the preferred embodiment, each bit determines whether one particular exception type can be deferred in hardware. Given the one-to-one correspondence between DCR bits and exception types, the operating system (OS) 320 has the flexibility to select 322 which exception types can be deferred in hardware and which cannot.

Exception classes represent the different exceptions which can occur during instruction execution. One class of faults is the class of data translation related faults. Other exception classes would comprise faults in translating the load, floating point related faults, and instruction fetch related faults. Within the data TLB class of faults, all the data reference type of faults would be defined in the DCR because these are faults raised by speculative loads. Each one of the different types of faults would have an associated bit in the DCR for speculative loads.

Note that the inventive mechanism will work for any faulting speculative operation, including any non-load operations. Thus, the load operation is used by way of example only. Moreover, the inventive mechanism will operate for non-speculative operations, particularly in FIG. 2, where fault resolution may be attempted on both speculative and non-speculative operations (including non-load operations).

The inventive mechanism 100 is defining exceptions to load conditions when virtual translations are enabled. As shown in FIG. 1, box 101 or begin load execution refers to an instruction which is fetched from memory and as part of the program instruction stream. This instruction specifies a normal load operation which is a reference to memory. Box 102 is discussed later with regard to recursive aspects of the inventive mechanism 100. Box 103 performs a test to determine whether an exception occurred during the load operation. Box 103 includes all of the normal TLB checks, which are checking for virtual address translation presence, and whether the specified reference is allowed. Other status checks are also performed which are necessary for the operating system to maintain the correct image in memory and still perform other operations such as paging, dirty bit references, or whether the page is actually referenced, or if there is a debug fault associated with this exception. Thus, all of these checks occur in box 103.

Note that if an exception did not occur, meaning that the load operation was successful, then it really does not matter whether this was a speculative load or a non-speculative load, as the no path is taken from box 103 down to box 108. Box 108 represents a successful load, and the return results from the load operation is written into the destination register of the load. After completion of the write and the other side effects, the load execution is ended 111, and the system is ready to continue on and fetch next instruction. Note that part of writing the destination register 108, will clear the deferred exception indicator for the target register.

If an exception did occur in box 103, then the yes path is followed to box 104, where it is determined whether the load is a speculative load or non-speculative load. If the load is non-speculative, then none of the hardware deferral mechanisms of FIG. 1 will operate, because they only have an effect for speculative loads. If the load is non-speculative, then the exception occurred in the home basic block, and thus the exception cannot be deferred, but rather must be addressed by whatever fault recovery mechanisms are present in the operating system or basic block. Thus, the no path is taken down to box 110, which generates the exception into the operating system. The exception that is generated is dependent upon the type of the exception. Note that at this point, the software mechanisms of FIG. 2 will operate, beginning with box 201.

If the load is a speculative load, then the yes path from box 104 is followed into box 105, where it is determined whether a hardware deferral can be performed. The exception deferral bit ITLB.ed, defined in the instruction TLB format specifies whether exceptions raised by speculative loads using this translation entry may be automatically deferred by the processor or may be deferred by an OS for non-fatal exceptions. In other words the ITLB.ed bit checks to see if the application 310, 311 has the ability for eager deferral or whether the system has to try resolving the exception before setting the deferred exception indicator. Note that the ITLB bit does not refer to the TLB for the data of the load, where the load is being performed from, but rather refers to the TLB for the instruction that is being executed 334. This is important because recovery code will be associated with the instruction that is executed, not associated with the data that is being loaded. Therefore, whether eager deferral is allowed must be determined through the attribute in the ITLB. An eager deferral is where the system has determined that it may require a great deal of work to determine whether the exception can be resolved, and thus to save time, the system will perform an automatic deferral.

Moreover, statistically, there is a good chance that this exception will never have to be dealt with, thus, it is more economical to automatically defer these types of exceptions. Thus, they are eagerly deferred, the deferred exception indicator is set, and if the results really are needed later, then the exception condition will be handled through recovery code.

However, if the application lacks recovery code for this type of exception, then the system is not going to try to resolve this exception later, thus failure had better really be a hard failure and the operating system should try to resolve this exceptions as best as it can. This is indicated from the application both to the hardware and to the operating system through the ITLB.ed bit.

Thus, the ITLB bit is used to communicate the status of recovery code in the running application, from the application to both the OS and the hardware. If the application does not have the ability to handle an eagerly deferred exception, then the ITLB.ed bit is going to be zero. This means that hardware cannot defer this exception, because it might be something that the operating system could resolve. Thus, the no path is taken from box 105 to box 110 where it will fault into the OS by generating an exception into the operating system. However, if the application can eagerly defer exception, then the yes path is taken out of box 105 into box 106, which selects a bit from the control register (DCR).

The control register (DCR) is the mechanism that the OS uses to communicate to the hardware about whether or not it has performed any fault specific optimizations. Deferral bits are defined in the DCR which classify exceptions that may be raised by speculative loads. These bits are used as one of the qualifiers for hardware to perform automatic speculative load exception deferral.

Once the DCR bit has been selected, box 107 determines whether the OS has specified that there is an optimization (or other recovery mechanism) associated with this specific fault or exception, and this is indicated by the DCR bit being equal to 0. Thus, this indicates which faults the operating system wants to handle for speculative loads.

In this case, with the DCR bit equal to 0, then the no path is followed from box 107 to box 110, and an exception into the operating system will be generated. This allows the operating system to perform its optimization for this fault without doing exception deferral, see FIG. 2 box 201. An example, if a page fault occurred, then the operating system would have a chance to walk the page tables and look for a translation and install it into the TLB before generating a deferred exception. Another example is for a key miss. Here the operating system has a chance to walk through a cache of keys in the table before generating a deferral.

If the operating system does not have any optimizations associated with these particular faults, and the only thing it will do is defer the exception by emulating the load and setting the deferred exception indicator, then it indicates that to the hardware by setting the DCR bit in the control register to 1. Thus, if the outcome of the test in box 107 is true, and thus both the application is ready for a deferral and the operating system does not have any optimizations to run, then the yes path is taken from box 107 to box 109. Box 109 writes the deferred exception indicator into the register, and then proceeds to end the load execution 111, without generating a fault into the operating system. Thus, when a speculative load raises an exception and the DCR deferral bit for that exception is set to 1, and the ITLB.ed bit for the speculative load's instruction page is set to 1, the hardware will perform automatic deferral of the exception. A compiler/linker may mark text segments with an attribute which the OS will use to set the ITLB.ed bit.

Note that the boxes in FIG. 1 are all performed during run time. During compile time, the attribute bits which are reflected in the ITLB.ed bit are set.

The bit in box 107 is set by the operating system either statically or on a process-by-process basis. Thus, at different times, the operating system may have different deferred exception policies for different applications. Therefore, this is set, not at compile time, but is set based on the current running process by the operating system. The test in box 104, as to whether the load is speculative or not, is determined at compile time with static code scheduling. There is a static determination by the optimization phase of program compilation on whether to issue this load speculatively and this is tested for in box 104.

In FIG. 1, the no paths from boxes 104, 105, and 107 all lead into box 110, the generation of an exception into the OS, which leads to box 201 on FIG. 2, the starting of the OS exception handler. The software mechanism 200 depicted in FIG. 2 allows the operating system to perform various virtual memory optimizations and various enhancements to hardware structures in box 202. The software attempts first level fault resolution techniques. For example, walking page tables, filling in protection key caches, and other things that the hardware does not have structures to do. This is not an exhaustive list of the kinds of things the operating system could do, but just two examples of types of optimizations that could be performed on speculative loads.

After the first level optimizations in box 202 have been attempted, box 203 determines whether they successfully resolved the fault or exception. If successfully resolved, the yes path from box 203 is followed to box 204, and the application is returned to the interrupted instruction for a retry of the instruction. The instruction in box 204 (as well as box 213) is also known as RFI or return from interrupt. This time the instruction should move toward completion because the fault condition has been resolved. Other faults may arise during the retry. Note that box 202 is performed at run-time, but is compiled by the operating system, statically into the code. It is not something that the hardware does dynamically based on the fault.

If the fault is not resolved by box 202, then the no path is followed from box 203 into box 205, where it is determined whether the load is speculative or non-speculative. Note that box 205 is the software parallel to box 104. Thus, software has the ability to make the same kinds of tests that the hardware is making. The ISR.sp bit of interruption status 333 specifies that the interruption is related to a speculative load operation. The ISR.sp bit allows the OS to quickly determine if a fault was generated by a speculative load. The compiler will use a different instruction for speculative loads than non-speculative loads. If the faulting instruction is a speculative load that fact will be automatically reported by hardware in the interruption status register, which sets the bit in box 205.

Box 205 is a precursor check to determine whether the exception can be eagerly deferred. Only speculative loads can be deferred.

Thus, if the load is not speculative then ISR.sp equals 0, and the no path to box 208 is followed, where the second level fault resolution is attempted. If the load is speculative, then ISR.sp bit is equals 1, then the yes path to box 206 is followed, where it is determined whether the ISR.ed set to 1. Box 206 is also a precursor check to determine whether the exception can be eagerly deferred. The ISR.ed indicates whether the application that is running can handle an eagerly deferred exception. The ISR.ed is a copy of the ITLB.ed bit for the instruction raising the exception. The bit is copied on an interruption. Note that box 206 is the software parallel to box 105. Thus the check in box 105 is mirrored in software with box 206. Thus, boxes 205 and 206 allow software to quickly determine that this was a speculative load and also to very quickly determine what kind of a speculative deferral behavior is expected by the application program.

If the application cannot handle eagerly deferred exceptions, with ISR.ed equal to 0, then the no path is followed from box 206 to box 208, to attempt second level fault resolution. If the application can handle the eager deferral of faults, box 206 is because ISR.ed is equal to 1, then the yes path to box 207 is followed, where the OS may impose some of its own policy. If the OS decides to eagerly defer this fault, then the yes branch from box 207 is followed to box 212, and software deferral of the exception is begun. However, the OS may decide that even though eager deferral would be allowed by the application and it is a speculative load, that it still wants to attempt second level fault resolution for a speculative load. Then the no path from box 207 is followed into box 208.

The second level fault resolution techniques are the heavier weight techniques such as a page fault handler or an access rights handler, or other virtual memory fault resolution routines. Again, these are provided as examples, and are not intended to constitute an exhaustive list. After attempting that second level fault resolution in box 208, the success is determined in box 209. If the resolution is successful, then the yes path is followed from box 209 to box 204, which is the return to the interrupted instruction. If the fault is not resolved in by the second level fault resolution techniques, then the no path is followed from box 208 to box 210.

In box 210 it is determined whether the original faulting instruction was a speculative load by checking ISR.sp bit. If it was not a speculative load, and thus ISR.sp equals 0, then the no path from box 210 to box 211 is followed, where a fault is delivered to interrupted context (the code that issued the speculative load). This may terminate process execution. Therefore, a non-speculative load will travel through mechanism 200, through the second level fault resolution 208, and if it is unresolved, box 210 will determine that it is a non-speculative execution, and will begin proceedings to terminate the process in box 211. However, if it is a speculative load, and both the first and second levels of fault resolution are not successful, a fault to software will not be raised, and the yes path from box 210 to box 212 will be followed.

In box 212, the IPSR.ed bit is set to 1. The IPSR.ed control bit directs the processor to set the deferred exception indicator for the next instruction (if it is a speculative load). This bit can only be set by the "return from interruption" instruction (RFI) in box 212 and is cleared by hardware after the execution of the current instruction. The PSR represents processor status register. This indicates to the hardware that the load that has failed, and the fault or exception has not been resolved, either because the OS could not via boxes 203 and 209, or the OS did not want to resolve it via box 207. From box 212, the mechanism 200 proceeds to box 213, which is the execution of the return from interruption (RFI) instruction and re-executes the load instruction. The hardware will not try to reissue the memory reference when PSR.ed is set (IPSR is copied to PSR by RFI), which is the main aspect of the compound load instruction. Instead, the hardware will set the deferred exception indicator in the target register and will perform the other load side effects of the speculative load, which include base address modification and ALAT updates (advance load address table hardware structure). Thus, the OS will cause hardware to set the deferred exception indicator for all faults generated by speculative loads which cannot be resolved. Therefore, when an OS defers a speculative load exception, it only has to set the IPSR.ed bit and issue the RFI instruction. The deferred exception indicator will be set by hardware and all other non-memory components of the compound speculative load operation will be performed.

Note that boxes 204 and 213 are both RFI boxes. The difference between these two is that in box 204 the IPSR.ed bit remains set to 0, the initial state set in box 202 by the hardware. However, in box 213 the IPSR.ed bit equals 1. This bit instructs the hardware to set the deferred exception indicator in the target register and only perform the load side effects, and not to try to perform the memory access. Thus, box 204 indicates that a fault has been resolved, but box 213 the fault is unresolved. The fault will be deferred until a later time, when (and if) the program reaches its home basic block. Thus, it is the responsibility of the code in the basic block to perform a check instruction on the target register of this speculative chain. The check instruction will cause recovery code to be invoked if there is a deferred exception indicator. Note that the recovery code is static or at compile time.

So the deferred exception indicator is one way that you can determine that the speculative load has failed when in the basic block. The other way is by what is called non-speculative consumption of the target register. Examples of non-speculative consumption of a register include: trying to move the value to a control register, or trying to move it to a branch register, or to store it to memory. These are termed non-speculative operations, and if attempted and failed, then the processor will raise a different type of software interruption, which will then be an indication that the program was not written correctly and, again, a fault to the interrupted context is raised but this time from the home basic block, not from the point to which the speculative load was hoisted.

In box 212, IPSR.ed is set to 1, this means that software is indicating to hardware that it wants the deferred exception indicator set. Note that the actual deferred exception indicator is different for a speculative load targeted at the floating point register file than it is for a speculative load targeted at the general register file. In a particular implementation, there is a 65th bit on the general register file that is used for deferred exception indicator, while there is reserved encoding in the floating point register file to determine that there is a deferred exception on the speculative load to that register. One of the advantages of this invention is that the software sets the IPSR.ed bit and leaves it up to hardware to do the deferral, and thus it is no more expensive to determine whether it is a floating point or a general register target. Note that nowhere in the inventive mechanism 100 and 200 is there a check what on the type of speculative operation, i.e. general or floating point, and since the hardware handles the deferral, then there is no need to further differentiate between general or floating point loads.

Note that both boxes 204 and 213 return to box 101 of FIG. 1. As discussed earlier, the IPSR.ed bit is set to 1 in box 202, and thus passed to box 101 by box 213 as 1, while IPSR.ed bit is set to 0 box 202 and remains unchanged through out 200, and thus is passed to box 101 by box 204 as 0. The IPSR bit is copied into PSR. Thus, in box 102, if PSR.ed equals 1 and the operation is a speculative load, then the yes path is followed from box 102 to box 109, which is the hardware deferral of the exception. If either the PSR.ed bit equals 0, or the operation is a nonspeculative load or a non-load operation, then the no path is followed into box 103, for further operations as discussed above.

The only case in which the end load execution box 111 is not reached is if the application is terminated in box 211 because a fault could not be resolved for a non-speculative instruction, in that case the fault is raised to the interrupted context, which may result in the program or application terminating.

Note that entry into box 101 from either box 204 or box 213 indicates that the execution is repeated. So faulting into the OS at box 201, the restart position that is indicated to the operating system is the faulting instruction. So upon return, the application returns to that instruction and replays it again. The instruction is replayed with either the PSR.ed bit set to 1 from box 213 or set to 0 from box 204. Since, there are multiple reasons why a load can fail, and each are reported one at a time to the operating system. Thus, the recursive nature of this mechanism checks again to determine if there is another fault in the next sequential aspect of the load operation. Note that aspects are in a sequence from the highest priority to the lowest priority.

Thus, if a higher priority aspect has a fault that is not resolved, then the mechanism will not bother to check for and/or resolve any lower priority aspect. In many cases if a higher priority fault cannot be resolved, then lower priority ones cannot be resolved. For example if higher priority a page fault cannot be resolved and is going to be deferred, then an access rights violation cannot be resolved because the application does not have a page. Therefore, the mechanism defers all lower priority aspects in addition to the faulting higher priority aspect. However, the mechanism can progress through higher priority aspects and defer the lower priority aspects. For example, suppose the above page fault is resolved, the mechanism then checks for access rights and determines that the application is trying to read an execute only page. At this point, the mechanism may decide to defer resolving this fault violation.

An example of the inventive mechanism 100, 200 involving protection keys. Suppose that an operating system is not using protection keys, which is one of the mechanisms that used in the virtual memory management. Consequently, if an operating system is not using the key mechanism, then any transaction that has a key fault should be invalid. So in this case, that operating system would indicate in the DCR to eagerly defer all key miss faults resulting from speculative loads, because if a key miss would have been encountered and that fault been raised into the operating system, the operating system would not have resolved the key miss for the load instruction. Thus, by setting the bit corresponding to this fault to 1 in the DCR, the OS can indicate to the hardware to defer this type of fault, and not to go through the more expensive operation of generating a pipeline break, reporting a software exception, which is going to require the emulation of the instruction and then return.

On the other hand, suppose an operating system uses keys as part of its virtual address management. A TLB is a translation look aside buffer, which is a hardware mechanism that caches virtual translation information and protection information. It can perform this operation very rapidly on an instruction-by-instruction cycle without causing software intervention. The operating system may define the key registers to be a cache containing a subset of all of the capabilities of the current application. Thus, if there is a key miss fault, then operating system may want to attempt fault resolution by looking through a larger memory based cache, locating the key for this reference, moving it into the protection key register, and then re-issuing the speculative load which may succeed. So in this case the operating system is performing some caching of the resources and some optimizations that are more than the resources that are built into the processor. Thus, that operating system probably would not set automatic hardware deferral in the DCR for key faults because it wants to attempt to resolve the faults before hardware does the deferral.

Furthermore, in the translation look aside buffers (TLB) each page has associated with it a field which states the protection key for this page. Access to that page will only be granted if that protection key also exists in a protection key register, which is another privileged state register in the processor. So it's a way of allowing protection other than through address space isolation. Thus, two different users can generate an address to a location and but only one of them has access to it because that user has the key in the key registers, while the other one does not have the key and thus does not have access. Now if a page is referenced, and the key is pulled out of the TLB, however the key is not found in the protection key register file, then a key fault is generated. Now if this was being performed with a speculative load, at the point where the key fault would have been raised, the DCR is queried. If software has indicated that it does not have recovery code or if the operating system has said that it wants to see key faults, then that fault will be raised to the OS. Then the operating system can actually perform some optimizations. However, if the application has recovery mechanisms and this indicated in the instruction TLB, and the operating system does not want to handle key miss faults, then this fault will be automatically deferred in hardware.

Therefore, the ITLB.ed bit allows communication between the application and the OS, and communicates information about the speculative recovery capability of an application. This allows an OS to defer expensive exceptions at speculative load time, knowing that if the non-speculative use of the data is on the execution trace that speculative recovery code will exist. On a speculative exception the ISR.sp bit is set to indicate a speculative load and ISR.ed is set to the value of ITLB.ed field of the faulting instruction. The DCR bits allow communication between the OS and the hardware, and are an indication of which speculative load exceptions should be automatically deferred. The PRS.ed bit allows communication between the OS and the hardware, and indicates that a speculative load instruction should generate a deferred exception indicator and perform all non-memory components of the compound operations specified in the current speculative load operation.

The inventive mechanism allows higher performance of programs utilizing speculative execution. Operating system policy decisions and caching of translation information can operate in the presence of speculative execution without the expense of unnecessarily deferred exceptions or the expense of emulating instructions in order to defer expensive exceptions. Thus, allowing automatic hardware deferral of certain exceptions and efficient hardware deferral under explicit software control can lead to higher performance through a reduced number of speculative check faults which are more easily resolved at speculative load time than at the non-speculative use of the load data. Higher performance also arises from more efficient mechanisms to defer exceptions which are too expensive to resolve at the time of the speculative load, or must be deferred until a non-speculative use.

Although the present invention and its advantages have been described in detail, it should be understood that various changes, substitutions and alterations can be made herein without departing from the spirit and scope of the invention as defined by the appended claims.

What is claimed is:

1. A system that provides operating system control of a hardware deferral of an exception that has occurred in the execution of an instruction in an application, the system comprising:

means for determining whether the instruction is speculative;

means for communicating first information, between the operating system and the hardware, about whether the exception is of a type which is to be automatically deferred by the hardware;

means for communicating second information, between the operating system and the application, about whether the operating system will attempt to recover from the exception prior to deferral; and means for communicating third information, between the operating system and the hardware, that indicates whether the hardware should defer the exception based upon at least one of the first information and the second information, and whether the instruction is speculative.

2. The system of claim 1, wherein:
the instruction is a speculative load.

3. The system of claim 1, wherein:
if the first information indicates that the exception should be automatically deferred and if the second information indicates that the operating system will not attempt to recover from the exception prior to deferral and the instruction is speculative, then the hardware will defer the exception.

4. The system of claim 1, wherein:
if the instruction is not speculative, then a means for handling exceptions in the operating system is invoked.

5. The system of claim 1, wherein:
if the first information indicates that the exception should not be automatically deferred, then a means for handling exceptions in the operating system is invoked.

6. The system of claim 5, wherein:
the third information indicates whether the means for handling exceptions is successful in resolving the exception.

7. The system of claim 5, wherein the means for handling exceptions comprises:

a first means for attempting fault resolution;

wherein if the first means is successful, then the third information will indicate that exception is resolved and that the hardware should not defer the exception.

8. The system of claim 7, wherein the first means was not successful, and the means for handling further comprises:

means for determining if the operating system chooses to defer the exception;

wherein if the operating system chooses to defer the exception and the instruction is speculative, then the third information will indicate that hardware should defer the exception.

9. The system of claim 8, wherein the operating system chooses not to defer the exception, and the means for handling further comprises:

a second means for attempting fault resolution;

wherein if the second means is successful, then the third information will indicate that exception is resolved and that the hardware should not defer the exception.

10. The system of claim 9, wherein:

the second means was not successful;

the instruction is speculative; and the third information indicates that hardware should defer the exception.

11. The system of claim 9, wherein:

the second means was not successful;

the instruction is not speculative; and the application is interrupted.

12. The system of claim 1, wherein:

if the second information indicates that the operating system will attempt to recover from the exception prior to deferral, then a means for handling exceptions in the operating system is invoked.

13. The system of claim 12, wherein:

the third information indicates whether the means for handling exceptions is successful in resolving the exception.

14. The system of claim 12, wherein the means for handling exceptions comprises:

a first means for attempting fault resolution;

wherein if the first means is successful, then the third information will indicate that exception is resolved and that the hardware should not defer the exception.

15. The system of claim 14, wherein the first means was not successful, and the means for handling further comprises:

means for determining if the operating system chooses to defer the exception;

wherein if the operating system chooses to defer the exception and the instruction is speculative, then the third information will indicate that hardware should defer the exception.

16. The system of claim 15, wherein the operating system chooses not to defer the exception, and the means for handling further comprises:

a second means for attempting fault resolution;
    wherein if the second means is successful, then the third information will indicate that exception is resolved and that the hardware should not defer the exception.

17. The system of claim 16, wherein:

the second means was not successful;

the instruction is speculative; and the third information indicates that hardware should defer the exception.

18. The system of claim 16, wherein:

the second means was not successful;

the instruction is not speculative; and the application is interrupted.

19. A method for handling, under control of an operating system, at least one exception occurring during executing a instruction in an application that is running on hardware, the method comprising the steps of:

(a) determining whether the instruction is speculative;

(b) determining whether the exception is of a type which is to be automatically deferred by the hardware;

(c) determining whether the operating system will attempt to recover from the exception prior to deferral; and (d) determining, based upon the determinations of step (a) and at least one of the steps (b) and (c), whether the hardware will defer the exception.

20. The method of claim 19, wherein:

the instruction is a speculative load.

21. The method of claim 19, further comprising the step of: deferring, by the hardware, the exception if step (a) determines that the instruction is speculative, step (b) determines that the exception is of a type which is to be automatically deferred by the hardware, and step (c) determines that the operating system will not attempt to recover from the exception prior to deferral.

22. The method of claim 19, further comprising the step of:

handling the exception in the operating system if the step (a) determines that the instruction is not speculative.

23. The method of claim 19, further comprising the step of:

handling the exception in the operating system if the step (b) determines that the exception should not be automatically deferred.

24. The method of claim 23, wherein the step of handling the exception comprises the steps of:

attempting a first fault resolution; and indicating that the that exception is resolved and that the hardware should not defer the exception, if the step of attempting a first fault resolution is successful.

25. The method of claim 24, wherein the step of attempting first fault resolution was not successful, and the step of handling further comprises the steps of:

determining if the operating system chooses to defer the exception; and deferring, by the hardware, the exception if the instruction is speculative and the operating system chooses to defer the exception.

26. The method of claim 25, wherein the operating system chooses not to defer the exception, and the step of handling further comprises the steps of:

attempting a second fault resolution; and indicating that the that exception is resolved and that the hardware should not defer the exception, if the step of attempting a second fault resolution is successful.

27. The method of claim 26, further comprising the step of: deferring, by the hardware, the exception if the second fault resolution was not successful and the instruction is speculative.

28. The method of claim 26, further comprising the step of:

interrupting the application if the second fault resolution was not successful and the instruction is not speculative.

29. The method of claim 19, further comprising the step of:

handling the exception in the operating system if the step (c) determines that the operating system will attempt to recover from the exception prior to deferral.

30. The method of claim 29, wherein the step of handling the exception comprises the steps of:

attempting a first fault resolution; and indicating that the exception is resolved and that the hardware should not defer the exception, if the step of attempting a first fault resolution is successful.

31. The method of claim 30, wherein the step of attempting first fault resolution was not successful, and the step of handling further comprises the steps of:

determining if the operating system chooses to defer the exception; and deferring, by the hardware, the exception if the instruction is speculative and the operating system chooses to defer the exception.

32. The method of claim 31, wherein the operating system chooses not to defer the exception, and the step of handling further comprises the steps of:

attempting a second fault resolution; and indicating that the that exception is resolved and that the hardware should not defer the exception, if the step of attempting a second fault resolution is successful.

33. The method of claim 32, further comprising the step of:

deferring, by the hardware, the exception if the second fault resolution was not successful and the instruction is speculative.

34. The method of claim 32, further comprising the step of:

interrupting the application if the second fault resolution was not successful and the instruction is not speculative.

* * * * *